United States Patent
Tischer

(10) Patent No.: US 8,065,027 B2
(45) Date of Patent: *Nov. 22, 2011

(54) AUDIO ALERT SYSTEM AND METHOD

(75) Inventor: Steven N. Tischer, Atlanta, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 102 days.

This patent is subject to a terminal disclaimer.

(21) Appl. No.: 12/428,966

(22) Filed: Apr. 23, 2009

(65) Prior Publication Data

US 2009/0201167 A1   Aug. 13, 2009

Related U.S. Application Data

(60) Continuation of application No. 11/682,567, filed on Mar. 6, 2007, now Pat. No. 7,567,860, which is a division of application No. 11/318,125, filed on Dec. 23, 2005, now Pat. No. 7,558,384, which is a continuation of application No. 10/051,194, filed on Jan. 18, 2002, now Pat. No. 7,013,006.

(51) Int. Cl.
  *G08B 1/08* (2006.01)
(52) U.S. Cl. .................. 700/94; 340/539.13
(58) Field of Classification Search .......... 700/94; 340/539.13
  See application file for complete search history.

(56) References Cited

U.S. PATENT DOCUMENTS

| | | | |
|---|---|---|---|
| 4,508,937 A | 4/1985 | Burger et al. |
| 4,646,609 A | 3/1987 | Teruo et al. |
| 5,070,521 A | 12/1991 | Warner et al. |
| 5,481,599 A | 1/1996 | MacAllister et al. |
| 5,493,603 A | 2/1996 | Hirayama |
| 5,606,597 A | 2/1997 | Newland |
| 5,797,103 A | 8/1998 | Duda |
| 5,845,219 A | 12/1998 | Henriksson |
| 5,854,826 A | 12/1998 | Kim |
| 5,870,684 A | 2/1999 | Hoashi et al. |
| 5,884,200 A | 3/1999 | Yamane et al. |
| 5,926,090 A | 7/1999 | Taylor et al. |
| 5,939,981 A | 8/1999 | Renney |
| 5,945,656 A | 8/1999 | Lemelson et al. |
| 5,949,350 A | 9/1999 | Girard et al. |
| 6,018,654 A | 1/2000 | Valentine et al. |
| 6,032,053 A | 2/2000 | Schroeder |
| 6,035,195 A | 3/2000 | Kishida et al. |
| 6,070,053 A | 5/2000 | Yamshita |
| 6,075,998 A | 6/2000 | Morishima |
| 6,094,587 A | 7/2000 | Armanto et al. |

(Continued)

OTHER PUBLICATIONS

U.S. Appl. No. 11/669,446 (Tischer) filed Jan. 31, 2007.

(Continued)

*Primary Examiner* — Walter F Briney, III
(74) *Attorney, Agent, or Firm* — Woodcock Washburn LLP

(57) ABSTRACT

An audio alert system, device, and method includes an audio alert created by a user and programmed into a device, such as a wireless telephone. A user stores in the device a data structure relating an audio alert triggering event to the audio alert. When the device detects an occurrence of the particular audio alert triggering event, the device emits the audio alert related to the triggering event. As such, users are able to customize audio alerts that are easily recognizable and that are associated with a particular event, or signal. Audio alerts can be programmed using different devices and in various formats and can be transmitted to other devices. An audio alert triggering event can modulate an audio alert according to an external variable.

18 Claims, 5 Drawing Sheets

U.S. PATENT DOCUMENTS

| | | | |
|---|---|---|---|
| 6,122,366 | A | 9/2000 | Veschi |
| 6,236,858 | B1 | 5/2001 | Griffith |
| 6,246,761 | B1 | 6/2001 | Cuddy |
| 6,263,218 | B1 | 7/2001 | Kita |
| 6,269,257 | B1 | 7/2001 | Cannon et al. |
| 6,285,891 | B1 | 9/2001 | Hoshino |
| 6,308,086 | B1 | 10/2001 | Yoishino |
| 6,311,896 | B1 | 11/2001 | Mulla et al. |
| 6,332,075 | B1 | 12/2001 | Verdonk |
| 6,337,972 | B1 | 1/2002 | Jones et al. |
| 6,363,265 | B1 | 3/2002 | Ritter |
| 6,366,791 | B1 | 4/2002 | Lin |
| 6,496,692 | B1 | 12/2002 | Shanahan |
| 6,501,378 | B1 | 12/2002 | Knaven |
| 6,501,967 | B1 | 12/2002 | Makela et al. |
| 6,535,743 | B1 | 3/2003 | Kennedy et al. |
| 6,549,767 | B1 | 4/2003 | Kawashima |
| 6,560,466 | B1 | 5/2003 | Skorko |
| 6,636,602 | B1 | 10/2003 | Vlacancich |
| 6,934,747 | B1 | 8/2005 | McGrath et al. |
| 7,013,006 | B1 | 3/2006 | Tischer |
| 7,558,384 | B2 | 7/2009 | Tischer |
| 7,567,860 | B2 | 7/2009 | Tischer |
| 2004/0015989 | A1 | 1/2004 | Kaizu et al. |
| 2007/0121918 | A1 | 5/2007 | Tischer |
| 2007/0147601 | A1 | 6/2007 | Tischer |

OTHER PUBLICATIONS

U.S. Appl. No. 11/682,676 (Tischer) filed Mar. 6, 2007.
Final Rejection dated Mar. 5, 2009 from U.S. Appl. No. 11/682,676.
Non Final Rejection dated Sep. 3, 2008 from U.S. Appl. No. 11/682,676.
Restriction Requirement dated Apr. 8, 2008 from U.S. Appl. No. 11/682,676.
Notice of Allowance dated Jul. 10, 2009 from U.S. Appl. No. 11/682,676.
Non Final Rejection dated Jan. 4, 2007 from U.S. Appl. No. 11/318,125 now 7,558,384.
Non Final Rejection dated Mar. 20, 2007 from U.S. Appl. No. 11/318,125 now 7,558,384.
Non Final Rejection dated Sep. 17, 2008 from U.S. Appl. No. 11/318,125 now 7,558,384.
Notice of Allowance dated Mar. 5, 2009 from U.S. Appl. No. 11/318,125 now 7,558,384.
Non Final Rejection dated Mar. 17, 2008 from U.S. Appl. No. 11/682,567 now 7,567,860.
Final Rejection dated Oct. 29, 2008 from U.S. Appl. No. 11/682,567 now 7,567,860.
Notice of Allowance dated Jan. 23, 2009 from U.S. Appl. No. 11/682,567 now 7,567,860.
Non Final Rejection dated Mar. 8, 2004 from U.S. Appl. No. 10/051,194 now 7,013,006.
Final Rejection dated Nov. 17, 2004 from U.S. Appl. No. 10/051,194 now 7,013,006.
Non Final Rejection dated Apr. 26, 2005 from U.S. Appl. No. 10/051,194 now 7,013,006.
Notice of Allowance dated Nov. 18, 2005 from U.S. Appl. No. 10/051,194 now 7,013,006.
U.S. Appl. No. 11/669,446: Non-Final Office Action, dated Oct. 6, 2009, 17 pages.
U.S. Appl. No. 11/669,446: Notice of Allowance and Fee(s) due, dated May 13, 2010, 14 pages.
Zellweger et al., "An Overview of the Etherphone System and its Applications", Xerox Parc, CSL 89-2, May 1989, 66 pages.

ion by anyone of the patent document or the patent disclo-
AUDIO ALERT SYSTEM AND METHOD

CROSS REFERENCE TO RELATED APPLICATIONS

This patent application is a continuation of and claims priority to U.S. patent application Ser. No. 11/682,567, filed Mar. 6, 2007. U.S. patent application Ser. No. 11/682,567 is a divisional of and claims priority to U.S. patent application Ser. No. 11/318,125, filed Dec. 23, 2005. U.S. patent application Ser. No. 11/318,125 is a continuation of and claims priority to U.S. patent application Ser. No. 10/051,194, filed Jan. 18, 2002, which issued as U.S. Pat. No. 7,013,006. U.S. patent application Ser. Nos. 11/682,567, 11/318,125, and 10/051,194, and U.S. Pat. No. 7,013,006 are incorporated herein by reference in their entirety.

COPYRIGHT NOTIFICATION

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

TECHNICAL FIELD

The present invention relates to user-programmable audio alerts, such as telephone ring tones. Embodiments of the present invention provide a system and method—for users of devices, including wireless telephones, to create and program an audio alert.

BACKGROUND

With the proliferation of electronic devices, such as wireless telephones, pocket pagers, and other devices that employ audio-based alerts, there is an increasing number of alerts heard in a particular area at a given time. Many conventional wireless telephones have only one ring tone available. Other conventional wireless telephones offer only a limited selection of preprogrammed rings, or audio alerts, by which users can vary the audio alert, for example by selecting from available ring tones. A disadvantage of having only a few different audio alerts available in a device is that many such devices in a group of people emit the same ring tone, causing all who are accustomed to that tone to check their device(s) to see if their device is creating the sound.

Another disadvantage is that conventional audio alert systems do not allow combination of audio alerts or combination of an audio alert(s) with other notification features to create distinctive "morphed" audio alerts. Another disadvantage of conventional audio-based alert systems is that they do not allow creation of original tone sequences, or unique audio alerts, by users of wireless telephones or other devices. Another disadvantage of such currently available devices is that they do not allow users to associate a unique audio alert with a particular incoming signal. As such, current audio alert systems do not allow users to program customized audio alerts.

Thus, there is a need to provide a greater choice of audio alerts by users of devices such as wireless telephones. There is also a need to provide for audio alerts that are created by users of such devices. There is also a need to provide a capability for users to program devices to associate a unique audio alert with a particular incoming signal by which the signal source can be identified.

SUMMARY

Embodiments of the present invention provide user-programmable audio alert systems and methods. One embodiment of the present invention comprises an audio alert created by a user; a device capable of storing and emitting the audio alert; and a user-programmed data structure that relates the audio alert with an audio alert triggering event and that is stored in the device. When the device detects an occurrence of the audio alert triggering event, the device emits the audio alert related to the event. A user may create a plurality of audio alerts, and the user programs a data structure to relate one of the plurality of audio alerts with the audio alert triggering event.

Audio alerts can be programmed using different devices and in various formats. In one embodiment, audio alerts are programmed with a keypad. The device can comprise a wireless telephone, and audio alerts can be programmed with a keypad on the wireless telephone. In an embodiment of the present invention, an audio alert comprises a sequence of numbers in which each number represents a distinct musical tone. In other embodiments, audio alerts are programmed with a personal computer.

A device of the present invention can include a capability to transmit audio alerts to another device capable of storing and emitting the audio alerts. In addition, such a device further includes a capability to transmit a user-programmed data structure to another device so that when the other device detects an occurrence of the audio alert triggering event, the other device emits the audio alert related to the triggering event. The present invention also includes devices capable of receiving from another device audio alerts, user-programmed data structures related to particular audio alert triggering events, and audio alert triggering events, or signals.

In embodiments of this system, an audio alert triggering event has a capability of modulating an audio alert according to an external variable. Such an external variable can comprise global positioning information, including relative distance information and/or directional information. In other embodiments, the external variable comprises retail information, such as price information.

Embodiments of the present invention also include a method of users programming audio alerts comprising the steps of creating an audio alert; providing a device capable of storing and emitting the audio alert; storing the audio alert in the device; and programming in the device a data structure relating the audio alert with an audio alert triggering event. When the device detects an occurrence of the audio alert triggering event, the device emits the audio alert related to the triggering event. Embodiments of methods also include creating a plurality of audio alerts; selecting one of the plurality of audio alerts; and programming the data structure to relate the selected audio alert with the audio alert triggering event.

Embodiments of the present invention also include a user-programmable device for emitting an audio alert comprising a storage capacity; an audio alert created by a user and stored in the device; a user-programmed data structure that relates the audio alert with an audio alert triggering event and is stored in the device; and a capability of emitting the audio alert. When the device detects an occurrence of the audio alert triggering signal, the device emits the audio alert related to the event.

Features of a user-programmable audio alert system, method, and device of the present invention may be accomplished singularly, or in combination, in one or more of the embodiments of the present invention. As will be appreciated by those of ordinary skill in the art, the present invention has wide utility in a number of applications as illustrated by the variety of features and advantages discussed herein.

A user-programmable audio alert system, method, and device of the present invention provides numerous advantages over prior audio alert systems. For example, the present invention advantageously provides a system that allows creation of unique audio alerts by users, rather than limiting a user to one, or a few, pre-programmed audio alert(s) in a device.

Another advantage is that the present invention provides for programming a user-selected audio alert to emit when a device detects an occurrence of a particular audio alert triggering event. As such, users can customize audio alerts that are easily recognizable and that are associated with a triggering event from a particular device.

Another advantage is that the present invention provides a simple and easy means for creating audio alerts by use of a standard numeric keypad, such as a standard telephone keypad. In addition, the present invention allows users to create audio alerts with a sequence of numbers from a keypad in which each number represents a distinct musical tone.

The present invention also provides the advantage of readily available means for programming and storing audio alerts using a wireless telephone.

The present invention also allows programming of audio alerts in various formats, including standard Musical Instrument Digital Interface (MIDI) format. Such format flexibility provides the advantage of having a wide range of content available for creating unique audio alerts.

Another advantage is that the present invention allows transmission of audio alerts for use with other devices. Format interchangeability allows use of audio alerts created in one format to be transmitted and used in a different format with another device.

Still another advantage is that the present invention provides a capability of modulating audio alerts according to an external variable, including position, distance, and/or direction relative to another device or location. The present invention also provides for beneficial modulation according to external variables such as retail information.

Still another advantage is that the present invention can be used in a variety of applications, including with wireless telephones, electronic mail, other messaging systems, bar code scanners, and other systems using audio alerts.

Yet another advantage is that the present invention provides interest to consumers in personalizing communications systems and electronic equipment.

As will be realized by those of skill in the art, many different embodiments of a user-programmable audio alert system, method, and device according to the present invention are possible. Additional uses, objects, advantages, and novel features of the invention are set forth in the detailed description that follows and will become more apparent to those skilled in the art upon examination of the following or by practice of the invention.

DETAILED DESCRIPTION OF ILLUSTRATIVE EMBODIMENTS

Figure 1:
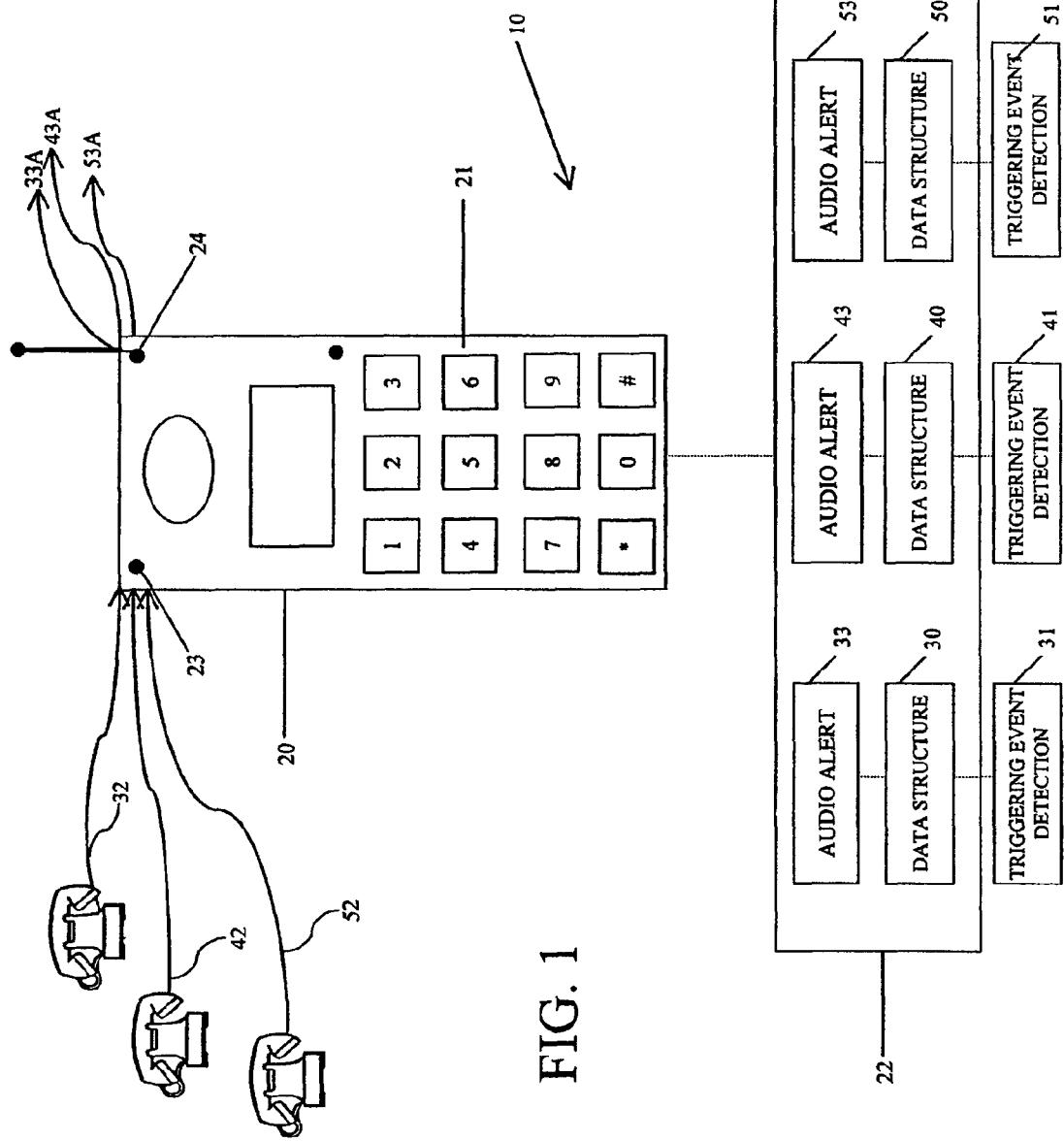
FIG. 1 is an illustration of an audio alert system in an embodiment of the present invention.

FIGS. 1-5 show various aspects of embodiments of the present invention. One embodiment comprises a user-programmable audio alert system that allows a user to create audio alerts from a standard numeric keypad, such as on a wireless telephone, and to program the telephone to emit a selected audio alert when the telephone receives a particular signal. FIG. 1 shows one such embodiment.

Referring to FIG. 1, audio alert system 10 includes a wireless telephone 20 having a standard numeric keypad 21 and a storage capacity 22 for storing data, for example in a non-volatile memory. Wireless telephone 20 includes a receiver 23 capable of receiving incoming signals. Signaling is utilized in a telecommunications system to perform call-handling functions. For example, signaling includes the process of generating and exchanging information among components of a telecommunications system to establish, monitor, or release connections. Alerting, or ringing, signals notify users or equipment of some occurrence, such as an incoming call. An alerting signal is initiated by pressing appropriate dialing keypads on a call-originating telephone to generate a dual-tone multiple frequency (DTMF) address signal. A DTMF address signal utilizes combinations of frequencies that represent digits or characters to create the unique telephone number address to which the ringing signal of an incoming telephone call is transmitted. In FIG. 1, the receiver 23 is capable of receiving alerting, or ringing, signals that notify the wireless telephone 20 of an incoming call from the particular call-originating telephone number.

Wireless telephone 20 also includes an emitter 24 for emitting ringing signals, or audio alerts. An audio alert comprises the sound emitted from a device when the device detects an occurrence of a particular triggering event. A user of the wireless telephone 20 creates unique audio alerts 33, 43, and 53 by programming with the keypad 21, and stores alerts 33, 43, and 53 in storage 22 of the wireless telephone 20. The wireless telephone 20 can be programmed to emit one of the unique audio alerts 33, 43, and 53 when the wireless telephone 20 detects an occurrence of a triggering event.

In another aspect of the present invention, audio alerts are programmed for storage, retrieval, and use in various functional data components, such as in a data structure, array, list, and file. A functional data component provides an interface between an audio alert triggering event, an audio alert, and a device. A user programs a data structure, for example, to relate the detection of an occurrence of a predetermined audio alert triggering event to a particular audio alert, and to cause a device in which the data structure is stored to emit the audio alert when the triggering event is detected. An example of an audio alert triggering event is a ringing signal originating from a particular telephone number. Another example of an audio alert triggering event is an electronic mail message received from a particular computer network address. In embodiments of the present invention, a user can program a data structure to relate an occurrence of a particular audio alert triggering event to an audio alert pre-programmed in a device by the manufacturer or to an original audio alert created by the user.

In an embodiment as shown in FIG. 1, data structure 30 is programmed to relate the detection 31 of an occurrence of audio alert triggering event 32 to audio alert 33. When wireless telephone 20 detects an occurrence of audio alert triggering event 32, data structure 30 causes emitter 24 to emit an iteration 33A of audio alert 33. In like fashion, data structure 40 relates the detection 41 of an occurrence of audio alert triggering event 42 to audio alert 43. When wireless telephone 20 detects an occurrence of audio alert triggering event 42, data structure 40 causes emitter 24 to emit an iteration 43A of audio alert 43. Similarly, data structure 50 relates the detection 51 of an occurrence of audio alert triggering event 52 to audio alert 53, such that when wireless telephone 20 detects an occurrence of audio alert triggering event 52, data structure 50 causes emitter 24 to emit an iteration 53A of audio alert 53. While FIG. 1 shows three instances of a data structure relating detection of an audio alert triggering event to an audio alert in a device, embodiments of the present invention include more than three audio alerts programmed in a device, and more than three data structures relating detection of particular audio alert triggering events to audio alerts.

As an example of the operation of the audio alert system in FIG. 1, a user of wireless telephone 20 programs data structure 40 to relate detection 41 of audio alert triggering event 42, which, by way of example, is the ringing signal from the user's home telephone number, to audio alert 43. When a call is made to wireless telephone 20 from the user's home telephone, wireless telephone 20 detects audio alert triggering event 42. Data structure 40 then causes wireless telephone 20 to emit an iteration 43A of audio alert 43. Because audio alert 43 is uniquely related to calls from the user's home telephone number, the user is able to auditorily identify that the call received on wireless telephone 20 originated from her home telephone.

While the embodiment in FIG. 1 shows that a user can create, or program, audio alerts using a keypad on a wireless telephone, audio alerts can also be programmed using keypads on other data entry devices, for example a bar code scanner used with a check-out register. In other embodiments, audio alerts are created with one device and transmitted to another device for storage and use. For example, audio alerts can be programmed on one telephone and transmitted to another telephone for storage and use. Audio alerts can also be created using a personal computer and then uploaded to another device, such as a wireless telephone. In alternative embodiments, audio alerts are stored on a computer network server and may be accessed and used with multiple devices.

Audio alerts of the present invention can be programmed, stored, and transmitted in various formats. For example, audio alerts can be created using a Musical Instrument Digital Interface (MIDI) format. MIDI is an interface that enables a personal computer to send and receive messages for the purpose of creating music, sound, or lighting. In another format, an audio alert comprises a sequence of numbers programmed using a keypad, wherein the numbers represent musical notes. In other embodiments, audio alerts are created, stored, and transmitted in MP3 format. MP3 is a Moving Picture Expert Group (MPEG) standard comprising a digital audio compression algorithm used especially for digitally transmitting music over a computer network, such as the Internet. In still other embodiments, audio alerts are programmed using a unique audio alert protocol format.

In embodiments of the present invention, audio alerts can be created, saved, and transmitted in one format and converted to a different format for use. For example, an audio alert programmed to play a Bach piece in a unique audio alert protocol could be transmitted to another device and converted into a MIDI format and played with different instruments. Audio alerts can be created and transmitted using a pulse-based format or a tone-based format, such as dual tone multiple frequency (DTMF). DTMF is a dialing method which utilizes tones to represent numbers for the dialing procedure. Such format interchangeability of audio alerts allows use of the audio alerts in any device with the proper interface, and thus flexibility in a variety of applications.

In embodiments of the present invention, audio alerts comprise content in various formats that may be pre-existing, including professionally created content, and/or created by a user. As an example, a user may program an audio alert using the first bar of Beethoven's Ninth Symphony. Alternatively, an audio alert may comprise a digital recording of a user's spouse saying "It's me!" Audio alerts can be customized to include a combination of pre-existing and user-created content. For example, a user could customize an audio alert by combining the first bar of Beethoven's Ninth Symphony and a digital recording of a user's spouse saying "It's me!"

Embodiments of the present invention include audio alert triggering events that are detected by a device, such as the wireless telephone 20 in FIG. 1. Audio alert triggering events comprise various forms and may be transmitted in different modes, depending on the design and detection capabilities of a receiving device. One example of an audio alert triggering event is a ringing signal originating from a particular telephone number. A ringing signal using a DTMF format is a typical call notification modality utilized in a telecommunications system. Another example of an audio alert triggering event is an electronic mail message received from a particular computer network address. In this instance, an audio alert triggering signal can be transmitted digitally along with the electronic mail message. In embodiments, audio alert triggering events, or signals, are transmitted between devices as data embedded within a primary message, as tags in a transmission language, and utilizing other suitable means, such as, for example, radio frequency and infrared transmissions.

Audio alerts of the present invention can be combined with other audio alerts and/or with other notification features. For example, an original audio alert tone sequence could be combined with a commonly available audio alert tune to create a distinctive "morphed" audio alert. Also, a short voice recording could be added to a distinctive audio alert.

Figure 2:
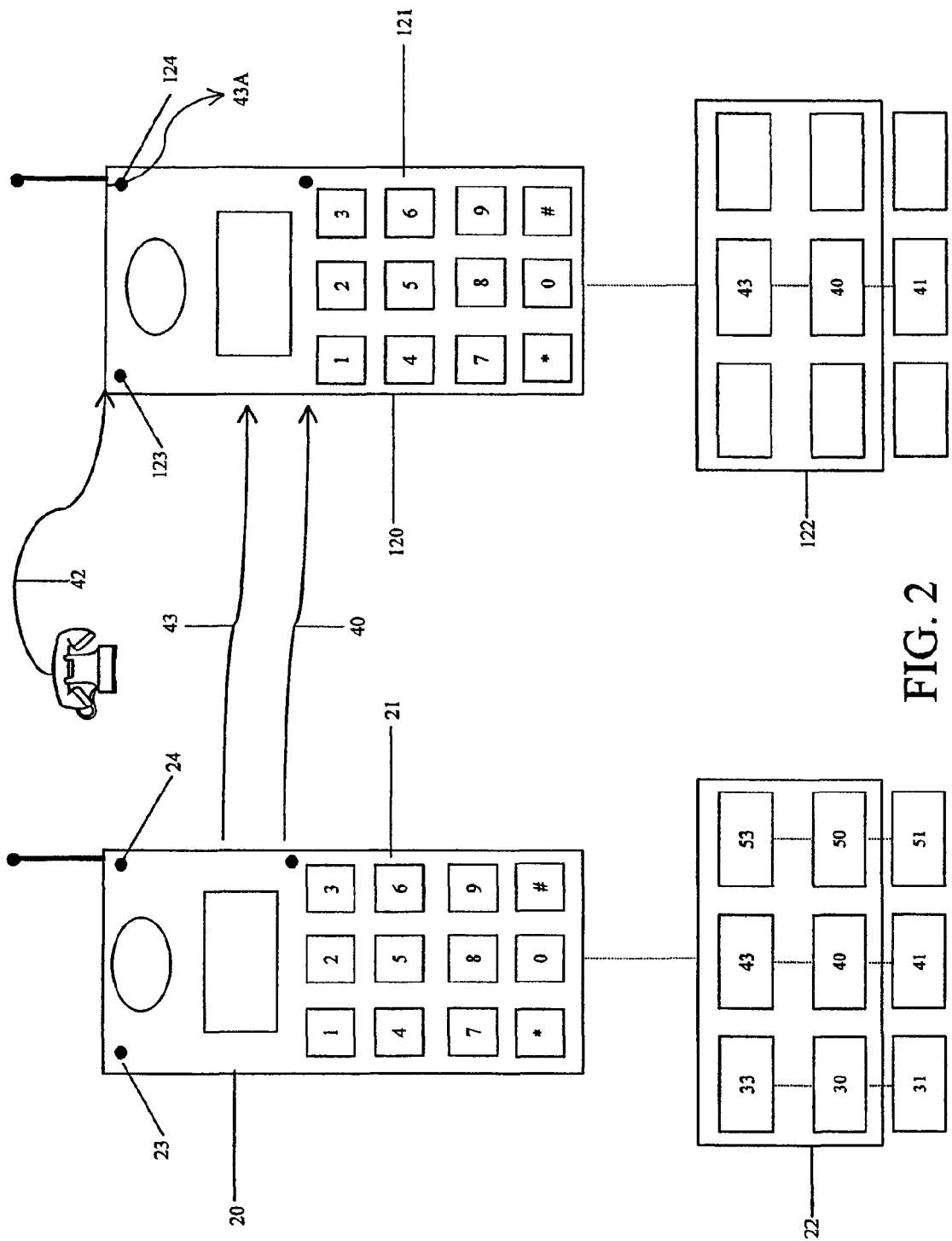
FIG. 2 is an illustration of an audio alert system in another embodiment of the present invention.

In embodiments of the present invention, user-programmed audio alerts and data structures are exchanged between devices. Referring to FIG. 2, wireless telephone 20 of FIG. 1 has a capability to transmit user-programmed audio alerts 33, 43, and 53 and data structures 30, 40, and 50 to another wireless telephone 120 capable of receiving, storing, and using such transmissions. For purposes of illustration, wireless telephone 120 is similar to wireless telephone 20, and includes a keypad 121, a storage capacity 122 for storing data, a receiver 123 capable of receiving audio alert triggering events, such as ringing signals, and an emitter 124 for emitting audio alerts. In wireless telephone 20, data structure 40 is programmed to relate the detection 41 of an occurrence of audio alert triggering event 42 to audio alert 43. A user transmits audio alert 43 and data structure 40 from wireless telephone 20 to wireless telephone 120. Wireless telephone 120 receives the transmission and stores audio alert 43 and data structure 40 in storage 122. Thereafter, when wireless telephone 120 detects an occurrence of audio alert triggering event 42, data structure 40 causes emitter 124 to emit an iteration 43A of audio alert 43.

Audio alerts can be transmitted to dissimilar wireless telephones and to other types of devices, provided that a receiving device is capable of receiving and storing transmissions of audio alerts. A receiving device may have the same audio alert architecture, for example, software or format, as a transmitting device. However, a receiving device can use a different format, or software, to store and emit audio alerts after receiving audio alert transmissions from another device. In addition, audio alerts can be transmitted between devices in various ways, such as by radio frequency, infrared signal, direct connection, or by other suitable means.

In embodiments of the present invention, audio alerts are associated with particular functions, such as auditorily identifying the originating number of an incoming telephone ringing signal. Another function is auditory identification of a specific sending address of an electronic mail message over a computer network. In addition to such identification functions, audio alerts can be modulated according to an external variable. Modulation is a process of varying certain parameters in a carrier, or base, signal in accordance with the characteristics of another signal, such as an information-bearing, modulating input signal. A base signal can be modulated by changes in amplitude, frequency, phase, or in other characteristics. Audio alerts can be modulated by variables so as to effect changes in duration, intensity, pitch, and/or octaves of the emitted audio alerts.

Figure 3:
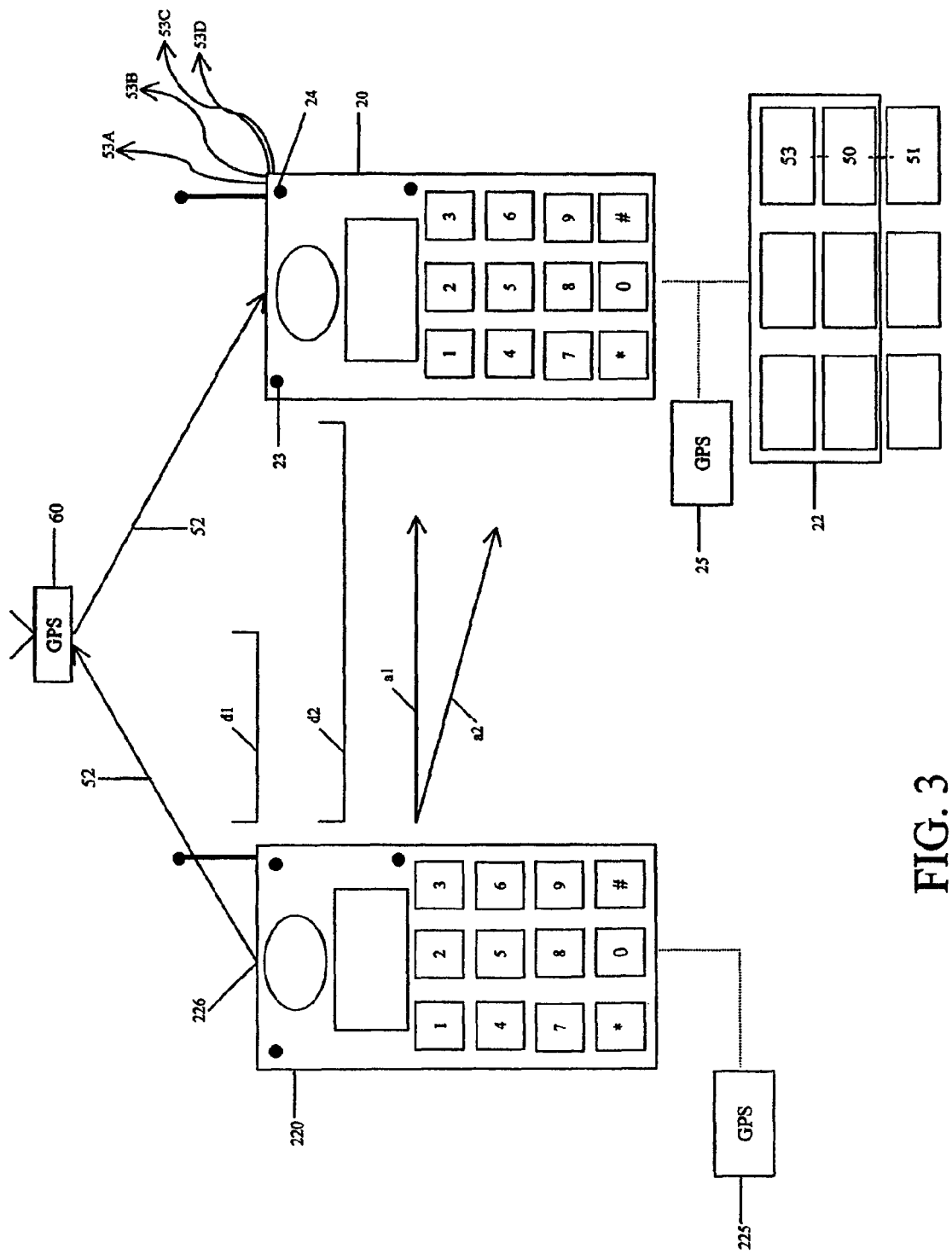
FIG. 3 is an illustration of an audio alert system in still another embodiment of the present invention.

FIG. 3 illustrates an embodiment of such modulation of emitted audio alerts by external variables. In FIG. 3, wireless telephone 220 includes a transmitter 226 for transmitting signals, including audio alert triggering event, or signal, 52. Wireless telephone 220 also includes a global positioning system interface 225, which allows receipt and transmission of global positioning information, such as latitude, longitude, and altitude. Wireless telephone 20 includes a receiver 23 for receiving incoming transmissions, an emitter 24 for emitting audio alerts, and storage 22 having audio alert 53 and data structure 50 stored therein. Data structure 50 is programmed to relate detection 51 of an occurrence of audio alert triggering event 52 to audio alert 53, such that when wireless telephone 20 detects an occurrence of audio alert triggering event 52, data structure 50 causes emitter 24 to emit an iteration 53A of audio alert 53. Wireless telephone 20 also includes a global positioning system (GPS) interface 25. When wireless telephone 220 is a distance d1 from wireless telephone 20, wireless telephone 220 transmits audio alert triggering signal 52 to wireless telephone 20 via global positioning system 60. Upon receiving audio alert triggering signal 52 from wireless telephone 220 at distance d1, wireless telephone 20 detects audio alert triggering signal 52, and data structure 50 causes emitter 24 to emit iteration 53A of audio alert 53 to indicate the relative distance d1 between the positions of the two wireless telephones 20 and 220.

As wireless telephone 220 moves from distance d1 to distance d2 relative to wireless telephone 20, wireless telephone 220 transmits audio alert triggering signal 52 to wireless telephone 20 via global positioning system 60. Upon receiving audio alert triggering signal 52 at distance d2, wireless telephone 20 detects audio alert triggering signal 52, and data structure 50 causes emitter 24 to emit iteration 53B of audio alert 53 to indicate the new relative distance d2 between the positions of the two wireless telephones 20 and 220. Iteration 53B of audio alert 53 emitted from wireless telephone 20 is a modulated variation of iteration 53A of audio alert 53, indicating a change in relative distance between the two wireless telephones 20 and 220. Thus, audio alert 53 is modulated by the external variable of distance between the two wireless telephones 20 and 220. Transmission of audio alert triggering signal 52 from wireless telephone 220 can be continuous as wireless telephone 220 moves in position from distance d1 to distance d2 relative to wireless telephone 20. During such movement, modulation of iterations of audio alert 53 emitted by wireless telephone 20 changes, becoming louder or more rapid, for example, indicating continuing changes in relative distance between the two wireless telephones 20 and 220.

Another variable by which audio alerts can be modulated using global positioning information is directional movement. As shown in FIG. 3, when wireless telephone 220 is positioned at a direction, or angle, a1 from wireless telephone 20, wireless telephone 220 transmits audio alert triggering signal 52 to wireless telephone 20 via global positioning system 60. Upon receiving audio alert triggering signal 52 from wireless telephone 220 at directional, wireless telephone 20 detects audio alert triggering signal 52, and data structure 50 causes emitter 24 to emit iteration 53C of audio alert 53 to indicate the relative directional between the positions of the two wireless telephones 20 and 220.

As wireless telephone 220 moves from directional to direction a2 relative to wireless telephone 20, wireless telephone 220 transmits audio alert triggering signal 52 to wireless telephone 20 via global positioning system 60. Upon receiving audio alert triggering signal 52 from wireless telephone 220 at direction a2, wireless telephone 20 detects audio alert triggering signal 52, and data structure 50 causes emitter 24 to emit iteration 53D of audio alert 53 to indicate the new relative direction a2 between the positions of the two wireless telephones 20 and 220. Iteration 53D of audio alert 53 emitted from wireless telephone 20 is a modulated variation of iteration 53C of audio alert 53, indicating a change in relative direction between the two wireless telephones 20 and 220 from directional to direction a2. Thus, audio alert 53 is modulated by the external variable of direction between the two wireless telephones 20 and 220.

As with changing relative distance, transmission of audio alert triggering signal 52 from wireless telephone 220 can be continuous as wireless telephone 220 changes from directional to direction a2 relative to wireless telephone 20. During such movement, modulation of audio alert 52 emitted by wireless telephone 20 changes, becoming louder or more rapid, for example, indicating continuing changes in relative direction between the two wireless telephones 20 and 220.

Modulation of audio alerts according to external variables has practical applications, such as being able to rapidly determine the proximity of another device or a person with a device. As in the embodiment in FIG. 3, for example, modulating audio alerts in a first device, based on the calculated distance of the first device from a second device using GPS data, allows real-time notification of movement between the two devices. As the second device moves relative to the first device, the audio alert changes correspondingly. Such an embodiment is useful for finding someone in close proximity, but not easily seen, as in a crowd. In addition, such a system can be used to identify the relative distance from more than one person. For example, if a distinctive audio alert is programmed into a device for devices transported by each of several people, for example children in a family, the distinctive audio alert for each device (and person) would change as that person's position changes relative to the monitoring device. As such, a parent could monitor each child's relative distance, and movement, from the parent.

Figure 4:
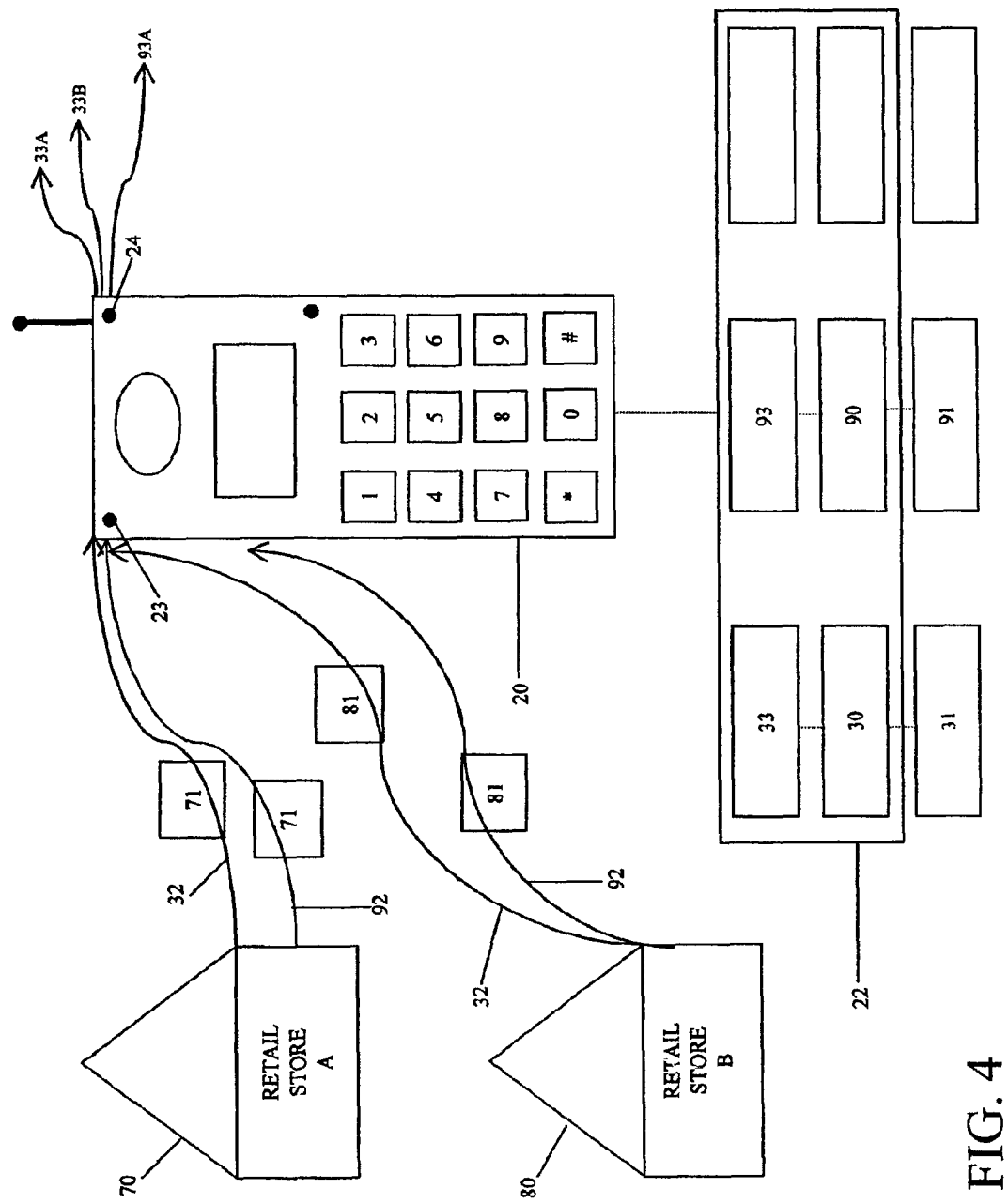
FIG. 4 is an illustration of an audio alert system in still another embodiment of the present invention.

FIG. 4 illustrates another embodiment of audio alert modulation by external variables. In FIG. 4, wireless telephone 20 includes a receiver 23 for receiving incoming transmissions, an emitter 24 for emitting audio alerts, and storage 22 having audio alert 33 and data structure 30 stored therein. Data structure 30 is programmed to relate detection 31 of an occurrence of audio alert triggering event, or signal, 32 to audio alert 33. When wireless telephone 20 detects an occurrence of audio alert triggering event 32, data structure 30 causes emitter 24 to emit an iteration 33A of audio alert 33. Wireless telephone 20 and receiver 23 are adapted to receive transmissions carrying retail information. Such retail information may include, for example, proximity to a particular type of retail store, availability of a particular retail item, price range, and relative price data. A device may be activated to receive price information for a product from a particular retail store, for example by pointing the device toward the store.

As an example of audio alert modulation by retail information, audio alert triggering signal 32 comprises the price for a selected product. Data structure 30 is programmed to detect audio alert triggering signal 32, and in particular the price of the selected product carried with the audio alert triggering signal 32. When wireless telephone 20 is activated to receive price information for the selected product from retail store A (70), audio alert triggering signal 32 carrying price information 71 is transmitted from retail store A (70) for that product to the wireless telephone 20. Upon receiving audio alert triggering signal 32 and price information 71 from retail store A (70), wireless telephone 20 detects audio alert triggering signal 32, and data structure 30 causes emitter 24 to emit iteration 33A of audio alert 33 to indicate price 71.

Wireless telephone 20 is then activated to receive price information for the same product from retail store B (80). Audio alert triggering signal 32 carrying price information 81 is transmitted from retail store B (80) for that product to the wireless telephone 20. Upon receiving audio alert triggering signal 32 and price information 81 from retail store B (80), wireless telephone 20 detects audio alert triggering signal 32, and data structure 30 causes emitter 24 to emit iteration 33B of audio alert 33 to indicate price 81 relative to price information 71. Audio alert 33B is a modulated variation, for example varied in pitch or frequency, of audio alert 33A, indicating a relative price difference between product price information 81 for retail store B (80) and product price information 71 for retail store A (70).

In embodiments, modulation of audio alerts according to price information can be customized. For example, an audio alert can be programmed to modulate upon receipt of price information from a retail store relative to a predetermined price to indicate, for example, prices higher or lower than a given price range. Using such a system, a customer can quickly and easily compare prices for a product in different retail stores. Alternatively, audio alerts can be programmed to include brand and/or advertising information, for example, to indicate presence of a particular brand of item.

In the embodiment shown in FIG. 4, audio alert triggering signal 92 comprises the price for a selected product. Data structure 90 is programmed in wireless telephone 20 to detect whether a price for the selected product carried on audio alert triggering signal 92 falls within a pre-determined price range. When wireless telephone 20 is activated to receive price information for the selected product from retail store A (70), audio alert triggering signal 92 carrying price information 71 is transmitted from retail store A (70) for that product to the wireless telephone 20. Upon receiving audio alert triggering signal 92 and price information 71 from retail store A (70), wireless telephone 20 detects audio alert triggering signal 32. The price 71 of the selected product in retail store A (70) falls within the pre-determined price range programmed in data structure 90, and data structure 90 causes emitter 24 to emit iteration 93A of audio alert 93 to indicate that price 71 falls within the pre-determined range. If price 71 did not fall within the price range programmed for detection in data structure 90, no audio alert would be emitted.

Wireless telephone 20 could then be activated to receive price information for the selected product from retail store B (80). If the price 81 fell within the pre-determined price range programmed for detection in data structure 90, iteration 93A of audio alert 93 would be emitted, and if price 81 did not fall within the programmed price range, no audio alert would be emitted. Using such an embodiment of the present invention in this manner, whether a selected product had a price within a programmed range could be determined for multiple retail stores.

In other embodiments, audio alerts are modulated by other programmed variables, such as the time of day. For instance, in a device having an appointment calendar, an audio alert can be programmed to emit at intervals and be modulated to be emitted more loudly as the time of an appointment draws nearer. In addition, a user can select a particular audio alert to be related to such a time-based signal unique to the type of appointment the audio alert is signifying. For example, one user-programmed audio alert could be used to signify appointments inside an office while another user-programmed audio alert could be used to signify appointments outside the office.

As mentioned herein, audio alerts of the present invention can be programmed in various formats. In one such format, an audio alert comprises a sequence of numbers programmed using a standard numeric keypad, such as on a wireless telephone or other data entry terminal. In an embodiment, numbers on the keypad correspond to relative tones in the musical scale. The number 1 corresponds to middle C, and each higher number represents a half-tone increment, such that 1=C, 2=C#, 3=D, 4=D#, and so on. A total of twelve numbers represent an entire octave. As an example, the musical notes for the song "Happy Birthday" (in the key of C) would be represented by 1 1 3 1 6 5 1 1 3 1 8 6 1 1(111)10 6 5 3 (11)(11)10 6 8 6. Striking the appropriate key twice in rapid succession represents the corresponding note in the next higher, or second, octave. In like fashion, striking the appropriate key three times in rapid succession represents the corresponding note in the next successively higher, or third, octave. In this example, "(11)" indicates striking the "1" key two times rapidly in succession, similar to double-clicking a computer mouse, and represents the C note in the second octave. Similarly, "(111)" indicates striking the "1" key three times rapidly in succession, and represents the C note in the third octave.

In addition, both note duration and intensity can be varied. For example, the asterisk key (*) could represent duration of notes, so that entering the sequence 1 1 3 * * 1 would make the third note twice as long, and in the above example, would make the resulting tune sound more like the traditional "Happy Birthday" tune. In similar fashion, the pound key (#) can be used to represent note intensity such that entering the # key after a note would make the previous note louder. For example, entering the # key following the sequence 1 1 3 1 6 5 # would make the note represented by "5" the loudest in this sequence. In such embodiments, a standard numeric keypad can be utilized by users to simply and easily program audio alerts.

Figure 5:
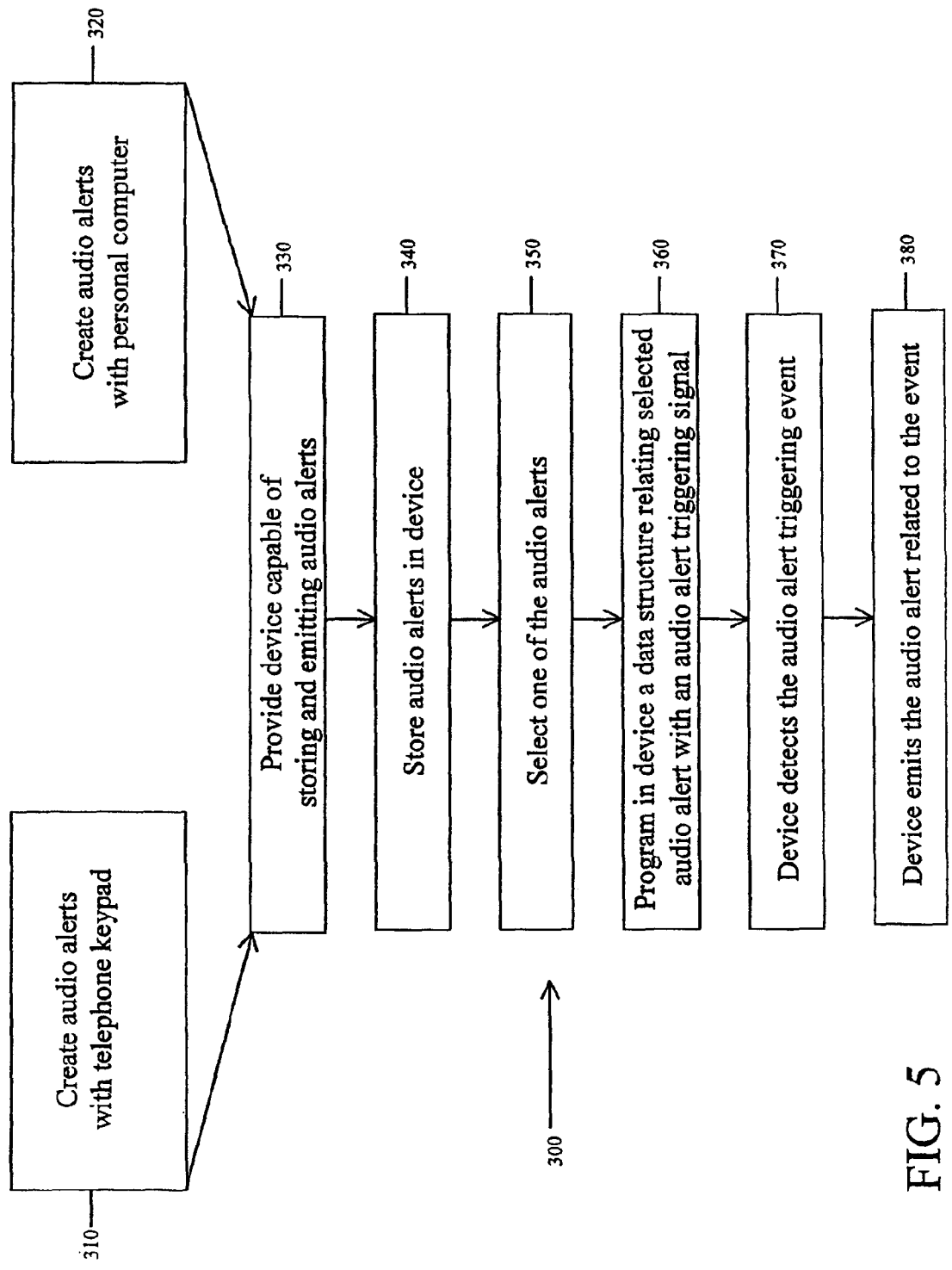
FIG. 5 is flow chart showing the steps in an embodiment of a method of the present invention.

The present invention comprises embodiments of methods for users to program audio alerts. FIG. 5 shows one such embodiment. As shown in the method 300 in FIG. 5, users can create audio alerts with a wireless telephone keypad (310) or with a personal computer (320). Method 300 includes providing a device capable of storing and emitting audio alerts (330). A user stores audio alerts (340) in the device. The user selects one of the audio alerts (350) and programs in the device a data structure relating the selected audio alert with an audio alert triggering event (360). When the device detects the audio alert triggering event (370), the device emits the audio alert related to the triggering event (380).

In embodiments of methods, a user transmits user-programmed audio alerts and data structures from one device to another device capable of storing and using the audio alerts.

In other embodiments of methods, a device modulates audio alerts according to an external variable. Audio alerts are modulated according to external variables such as global positioning information, including distance and direction information, and retail information, such as price information.

In still other embodiments of methods, users program audio alerts comprising a sequence of numbers wherein each number represents a distinct musical tone.

Embodiments of systems and methods of the present invention include applications in a variety of devices and communication systems. For example, audio alerts can be created, stored, and used in conjunction with wireless telephones, paging devices, dedicated global positioning system devices, and other wireless devices such as personal digital assistants (PDAs). In addition, audio alerts of the present invention can be utilized with electronic mail message systems in a computer network.

In other embodiments, audio alerts are programmed by users in bar code scanners, such as those used with check-out registers in retail stores. For example, at a supermarket check-out area, bar code scan tones are generally the same for each scanner, making it difficult to discern which register is scanning an item. Using the system and method of the present invention, unique audio alerts can be created and stored for each register and/or each check-out clerk. For example, each clerk's personal audio alert could be created using a standard number keypad, such as keypads supplied on the register/scanner. A personal identifier, such as the clerk's last name or employee identification number could be entered to create the unique audio alert. When the clerk logs in to a cash register/scanner, that particular clerk's unique user-programmed audio alert would be emitted each time an item is scanned by that clerk. As a result of scanning by a clerk producing a personalized audio alert, customers could correlate the scan of an item for purchase with the particular scanner being used by the clerk. In an alternative embodiment, a unique audio alert for each product, product type, and/or brand could be programmed to be emitted when the particular product or product type is scanned.

Although the present invention has been described with reference to particular embodiments, it should be recognized that these embodiments are merely illustrative of the principles of the present invention. Those of ordinary skill in the art will appreciate that a user-programmable audio alert system and method of the present invention may be configured and implemented in other ways and embodiments. Accordingly, the description herein should not be read as limiting the present invention, as other embodiments also fall within the scope of the present invention.

What is claimed:

1. An audio alert system, comprising:
   an audio alert;
   a device having an emitter for emitting one or more iterations of the audio alert and detecting an occurrence of an audio alert triggering event; and
   a data structure for relating the audio alert triggering event to the audio alert;
   wherein the device modulates the audio alert according to an external variable to generate the iterations including a modulated audio alert associated with the audio alert triggering event;
   wherein when the audio alert triggering event occurs, the data structure causes the device to emit the modulated audio alert associated with the triggering event; and
   wherein the device is configured to identify a position of the device relative to at least one additional device, and each of the at least one additional device is associated with a respective distinctive audio alert, each respective distinctive audio alert being modulated by the device as a respective position of the at least one additional device changes relative to the device.

2. The system of claim 1, wherein the modulated audio alert comprises the audio alert modulated according to global positioning information including at least one member of a group comprising position information, distance information, and directional information relative to another device or location associated with the triggering event.

3. The system of claim 2, wherein the another device comprises:
   a transmitter for transmitting the audio alert triggering event to the device; and
   a global positioning system interface that allows receipt and transmission of the global positioning information comprising latitude, longitude, or altitude of the device relative to the another device;
   wherein the device further comprises:
   a receiver for receiving incoming transmissions; and
   storage having the audio alert and the data structure stored therein; and
   wherein the external variable comprising the global positioning information causes the emitter to emit the modulated audio alert comprising an iteration of the audio alert.

4. The system of claim 3, further comprising a global positioning system wherein the external variable comprises the relative distance information;
   wherein the device further comprises a second global positioning system (GPS) interface; and wherein when the another device is a first distance from the device: the another device transmits an audio alert triggering signal to the device via the global positioning system; upon receiving the audio alert triggering signal from the another device at the first distance, the device detects the audio alert triggering signal and the data structure causes the emitter to emit the iteration of the audio alert to indicate the first distance between positions of the device and the another device.

5. The system of claim 4, wherein as the another device moves from the first distance to a second distance relative to the device, the another device transmits the audio alert triggering signal to the device via the global positioning system;
   wherein upon receiving the audio alert triggering signal at the second distance, the device detects the audio alert triggering signal and the data structure causes the emitter to emit a second iteration of the audio alert to indicate a new relative distance between the positions of the device and the another device.

6. The system of claim 5, wherein the second iteration of the audio alert comprises a modulated variation of the iteration of the audio alert the modulated variation of the iteration indicating a change in relative distance between the device and the another device.

7. The system of claim 6, wherein transmission of the audio alert triggering signal from the another device is continuous as the another device moves in position from the first distance to the second distance relative to the device; and
   wherein when continuing changes in the relative distance between the device and the another device occur, modulation of iterations of the audio alert emitted by the device changes, the modulation of the iterations therein becoming at least one of the following louder, more rapid, softer, and less rapid.

8. The system of claim 2, further comprising a global positioning system wherein the external variable comprises directional information;
   wherein when the another device is positioned at a first angle from the device the another device transmits an audio alert triggering signal to the device via the global positioning system; and
   wherein upon receiving the audio alert triggering signal from the another device at the first angle, the device detects the audio alert triggering signal and the data structure causes the emitter to emit an iteration of the audio alert to indicate the relative first angle between positions of the device and the another device.

9. The system of claim 8, wherein as the another device moves from the first angle to a second angle relative to the device, the another device transmits the audio alert triggering signal to the device via the global positioning system; and
   wherein upon receiving the audio alert triggering signal from the another device at the second angle, the device detects the audio alert triggering signal and the data structure causes the emitter to emit another iteration of the audio alert to indicate a new relative angle between the positions of the device and the another device whereby the another iteration of the audio alert emitted from the device comprises a modulated variation of the iteration of the audio alert indicating a change in relative direction between the device and the another device from the first angle to the second angle.

10. The system of claim 9, wherein transmission of the audio alert triggering signal from the another device is continuous as the another device changes from the first angle to the second angle relative to the device; and
    wherein when continuing changes in the relative direction between the device and the another device occur, modulation of iterations of the audio alert emitted by the device changes, the modulation of the iterations therein becoming one of the following louder, more rapid, softer, and less rapid.

11. The system of claim 2, wherein modulation of the audio alert according to the external variable enables the device to rapidly determine a proximity of the another device or a person with the another device to the device thereby allowing real-time notification of movement between the two devices.

12. A device for emitting an audio alert, comprising:
    storage for storing data;
    an audio alert stored in the device;
    a data structure programmed to relate detection of an occurrence of an audio alert triggering event and relate the audio alert triggering event to the audio alert, the data structure stored in the device; and
    an emitter for emitting the audio alert;
    wherein when the audio alert triggering event occurs, the data structure relates the audio alert triggering event and causes the device to emit the audio alert related to the triggering event;
    wherein the device is operable to modulate the audio alert according to an external variable associated with the audio alert triggering event, and
    wherein the device is configured to identify a position of the device relative to at least one additional device, and each of the at least one additional device is associated with a respective distinctive audio alert, each respective distinctive audio alert being modulated by the device as a respective position of the at least one additional device changes relative to the device.

13. The device of claim 12, wherein the external variable comprises global positioning information.

14. The device of claim 12, wherein the external variable comprises relative distance information.

15. The device of claim 12, wherein the external variable comprises directional information.

16. A method of customizing audio alerts in a device, comprising:
    storing an audio alert in the device;
    detecting an occurrence of an audio alert triggering event and relating the audio alert triggering event to the audio alert; and
    modulating the audio alert according to an external variable associated with the audio alert triggering event when the occurrence of the audio alert triggering event is detected;
    wherein modulating the audio alert generates a modified audio alert file; and
    wherein at least one distinctive audio alert associated with at least one additional device is modulated by the device as a respective position of the at least one additional device changes relative to the device.

17. The method of claim 16, wherein the external variable comprises global positioning information.

18. The method of claim 16, wherein the external variable comprises one of relative distance information and directional information.

* * * * *